(12) United States Patent
Clover

(10) Patent No.: US 9,709,456 B1
(45) Date of Patent: Jul. 18, 2017

(54) APPARATUS AND METHODS FOR PRESSURE TESTING OF TOOLS AND CONDUITS

(71) Applicant: Don K. Clover, Katy, TX (US)

(72) Inventor: Don K. Clover, Katy, TX (US)

( * ) Notice: Subject to any disclaimer, the term of this patent is extended or adjusted under 35 U.S.C. 154(b) by 384 days.

(21) Appl. No.: 14/521,197

(22) Filed: Oct. 22, 2014

Related U.S. Application Data

(63) Continuation of application No. 14/453,369, filed on Aug. 6, 2014, now abandoned, which is a continuation-in-part of application No. 13/815,998, filed on Mar. 21, 2013, now abandoned, which is a continuation of application No. 13/373,657, filed on Nov. 22, 2011, now abandoned.

(51) Int. Cl.
*G01M 3/02* (2006.01)

(52) U.S. Cl.
CPC ..................... *G01M 3/02* (2013.01)

(58) Field of Classification Search
CPC ............ G01M 3/02; G01M 3/04; G01M 3/26; G01M 3/28; G01M 3/2807; G01M 3/2815; G01M 3/2846; G01M 3/2853
See application file for complete search history.

(56) References Cited

U.S. PATENT DOCUMENTS

| | | | |
|---|---|---|---|
| 3,162,048 A | 12/1964 | Albertson et al. | |
| 3,975,944 A * | 8/1976 | Aprill, Jr. | G01M 3/3236 73/168 |
| 4,103,537 A * | 8/1978 | Victor | G01M 3/2807 73/40.5 R |
| 4,599,890 A * | 7/1986 | Girone | G01M 3/26 73/37 |
| 5,584,673 A * | 12/1996 | Rein | F04B 49/022 417/290 |
| 5,920,009 A * | 7/1999 | Enders | F02M 65/00 73/114.45 |
| 6,176,593 B1 * | 1/2001 | Spitler | B25H 3/02 362/154 |
| 6,279,383 B1 * | 8/2001 | Balke | G01M 3/2876 73/40 |
| 6,390,194 B1 | 5/2002 | Young et al. | |
| 6,599,430 B2 * | 7/2003 | Vickio, Jr. | B08B 9/0323 137/15.05 |
| 7,062,960 B2 | 6/2006 | Couren et al. | |
| 8,731,849 B2 | 5/2014 | Westra et al. | |
| 9,322,736 B2 * | 4/2016 | Peeler | G01M 3/02 |

(Continued)

*Primary Examiner* — Natalie Huls

(57) ABSTRACT

Apparatus and methods for pressure testing of conduits, tools, vessels, devices, or combinations thereof are described, which include a first testing unit having a first pump operable at a first pressure and a second testing unit having a second pump operable at a second pressure, both positioned in a housing. An auxiliary pump may be directly coupled with the output of one or both testing units to facilitate rapid achievement of a selected pressure. The testing units additionally include embodiments having electronic pressure control systems for rapid pressurization and remote control ability. Efficient, simultaneous testing of multiple objects, at differing pressures, is thereby possible, or alternatively, the second testing unit may be used for backup or redundancy purposes, or to further facilitate rapid achievement of the selected pressure by the first testing unit.

20 Claims, 15 Drawing Sheets

(56) References Cited

U.S. PATENT DOCUMENTS

| | | | | |
|---|---|---|---|---|
| 2009/0288836 A1* | 11/2009 | Goodall | ............. | E21B 33/0385 |
| | | | | 166/336 |
| 2010/0228222 A1* | 9/2010 | Williams | ............ | A61M 1/0058 |
| | | | | 604/500 |
| 2011/0163170 A1* | 7/2011 | Feldstein | .................. | F24F 6/14 |
| | | | | 236/44 A |
| 2011/0178736 A1* | 7/2011 | Westra | ................ | G01M 3/2815 |
| | | | | 702/50 |
| 2012/0248016 A1* | 10/2012 | Liou | ........................ | C02F 1/34 |
| | | | | 210/103 |

* cited by examiner

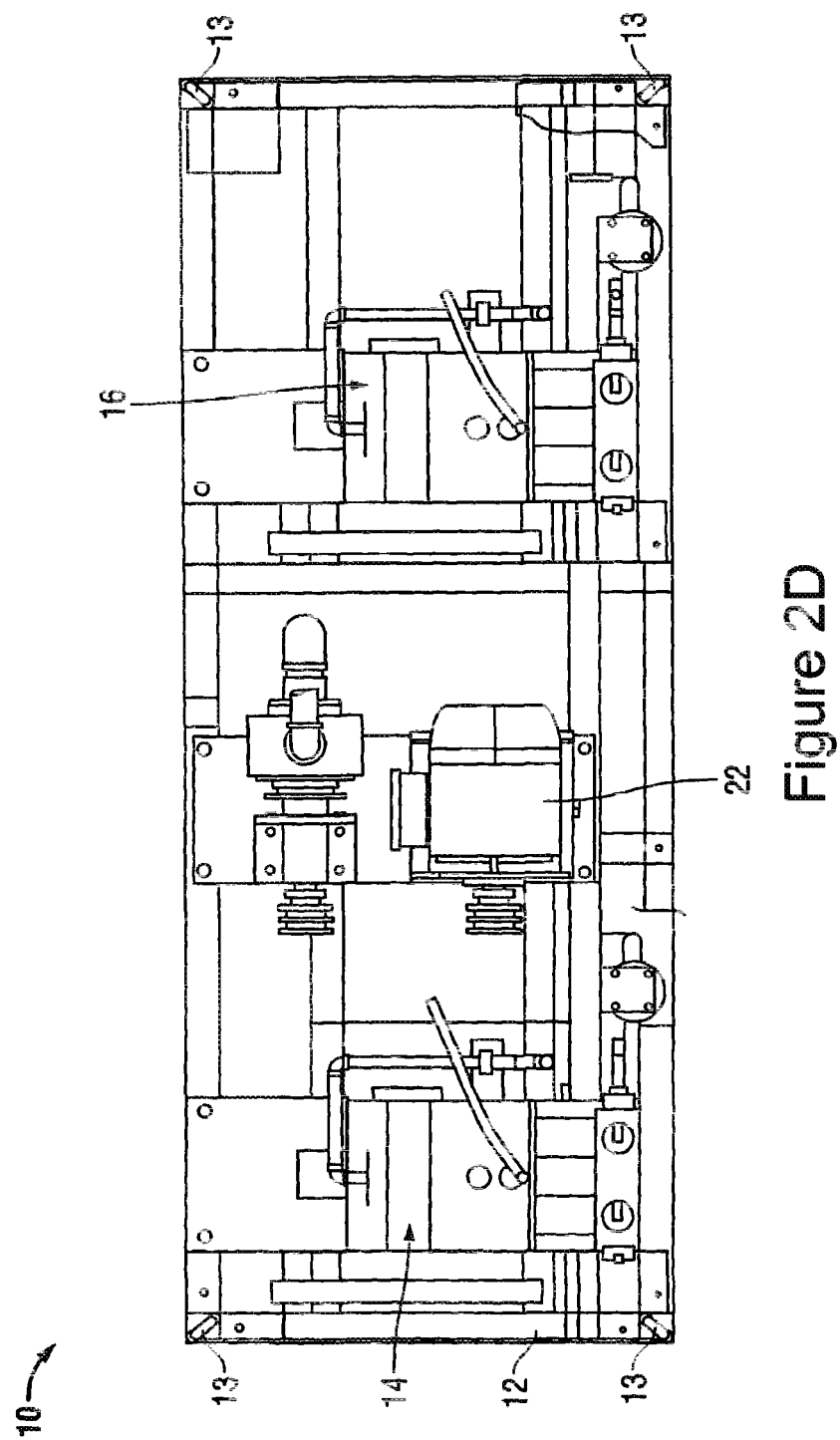

APPARATUS AND METHODS FOR PRESSURE TESTING OF TOOLS AND CONDUITS

The present application is a continuation that claims priority to co-pending U.S. patent application Ser. No. 14/453,369, filed on Aug. 6, 2014, which is a continuation-in-part of and claims priority to U.S. patent application Ser. No. 13/815,998, filed on Mar. 21, 2013, which is a continuation that claims priority to U.S. patent application Ser. No. 13/373,657, filed on Nov. 22, 2011, now abandoned, the disclosures of which are herein incorporated in their entireties by these references.

FIELD

Embodiments within the scope of this disclosure relate, generally, to systems, apparatus, and methods to apply a pressure to conduits, tools, and/or devices, typically for purposes of testing the integrity and capability of such conduits and/or devices, and more specifically, to apparatus and methods for pressure testing blowout preventers, risers, and similar devices, tools, and/or conduits.

BRIEF DESCRIPTION OF THE DRAWINGS

In the detailed description of various, example embodiments within the scope of the present disclosure, reference is made to the accompanying drawings, in which:

FIG. 2D depicts a top view of the apparatus of FIGS. 2A through 2C.

Figure 1A:
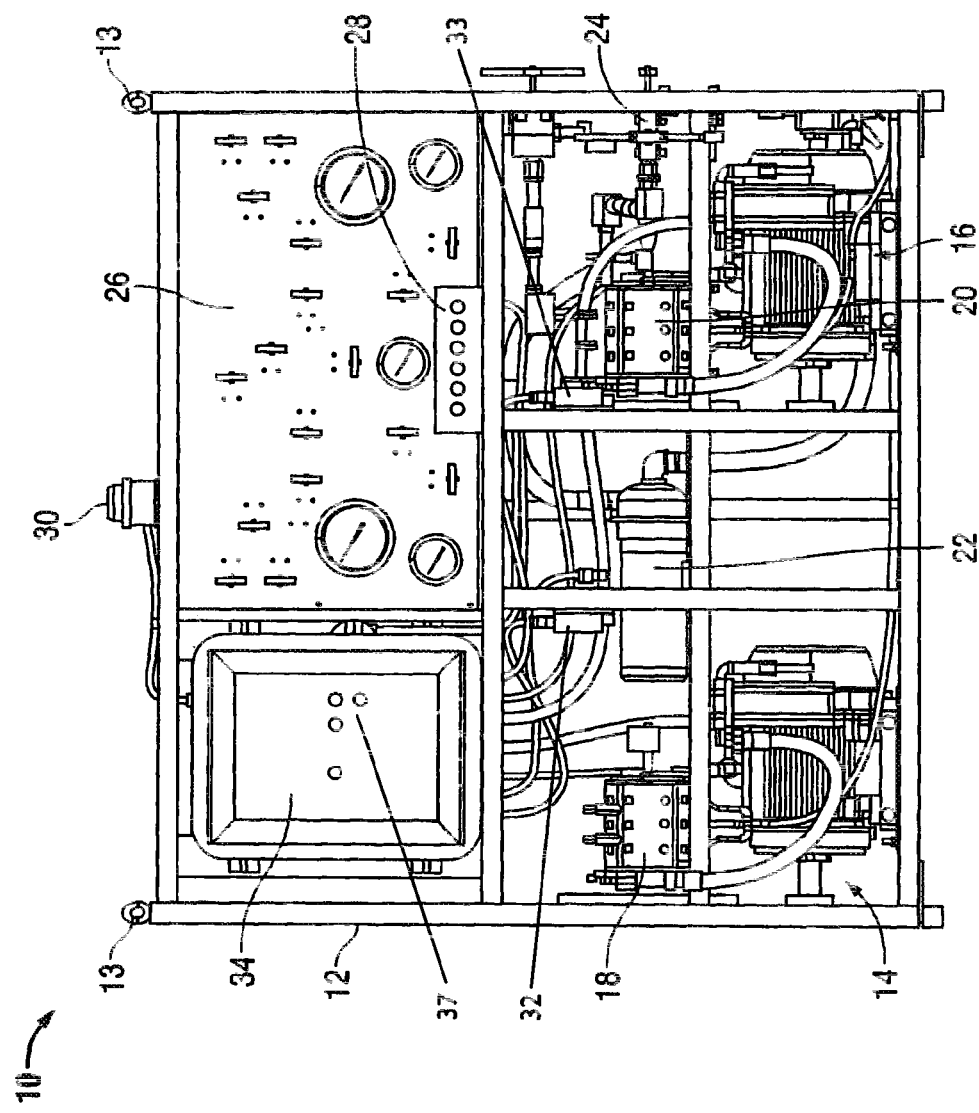
FIG. 1A depicts a front diagrammatic view of an embodiment of a testing apparatus.

One or more embodiments are described below with reference to the above-listed figures.

DETAILED DESCRIPTION OF THE EMBODIMENTS

Before describing selected, example embodiments of the present disclosure in detail, it is to be understood that the present invention is not limited to the particular embodiments described herein. The disclosure and description herein is illustrative and explanatory of one or more example embodiments and variations thereof, and it will be appreciated by those skilled in the art that various changes in the design, organization, order of operation, means of operation, equipment structures and location, methodology, and use of mechanical equivalents may be made without departing from the spirit of the invention.

As well, it should be understood the drawings are intended to illustrate and disclose presently example embodiments to one of skill in the art, but are not intended to be manufacturing level drawings or renditions of final products, and may include simplified conceptual views as desired for easier and quicker understanding or explanation. As well, the relative size and arrangement of the components may differ from that shown and still operate within the spirit of the invention.

Moreover, it will be understood that various directions such as "upper," "lower," "bottom," "top," "left," "right," and so forth are made only with respect to explanation in conjunction with the drawings, and that the components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Embodiments within the scope of the present disclosure include an apparatus for pressure testing conduits, tools, vessels, and/or devices (e.g., through performing hydrostatic testing thereof). Conventionally, to ensure safe operation of a blowout preventer, a riser connected thereto, and/or other similar tools, conduits, vessels, and/or devices, a testing apparatus (e.g., a hydrostatic testing unit comprising a pump motor, a fluid pump, inlet/outlet ports, conduits, and) is used to apply a pressure to the object to be tested. In use, the testing apparatus pumps water and/or other generally non-compressible fluids into a vessel and/or conduit to create a known internal pressure (e.g., 150% of the maximum expected pressure for the vessel or conduit), and maintains this pressure for a known duration while monitoring the pressure. A drop in pressure or other irregularities may indicate a leak and/or other damage to the object being tested that would prevent safe operation.

Specifically, embodiments described herein may include two testing units positioned within a single housing, usable to simultaneously test two different objects, e.g., by applying a selected pressure thereto and maintaining the selected pressure for a desired length of time. The first and second testing units may be operable at differing pressures, to facilitate testing of different types of objects and/or testing of the same object or types of objects under different pressures. An auxiliary pump (e.g., a low pressure, high volume, pre-fill pump) may be directly coupled (e.g., a direct drive charge pump) with the first and/or second testing units to facilitate rapidly achieving the selected pressure. When only a single object is tested, the second testing unit may be used to provide backup and/or redundancy to the first testing unit. In an embodiment, the pump of the second testing unit may be coupled to or otherwise used in conjunction with the pump of the first testing unit and the auxiliary pump to more rapidly achieve the selected pressure.

Conventional hydrostatic testing processes are often time consuming, due in part to the fact that a significant amount of time is required for a desired pressure to be achieved. Following completion of a testing procedure, additional time is then required to release the pressure, remove the testing apparatus from the object, couple the testing apparatus to a second object to be tested, then achieve a second desired pressure suitable for testing the second object. Use of an auxiliary (e.g., pre-fill) pump that is directly coupled to the conduits of first and/or second testing units (e.g., through direct attachment rather than through use of intermediate belts or similar members), as described herein, may enable a preselected pressure to be achieved rapidly, while simultaneous use of two testing apparatus within a single housing may enable multiple testing operations to be performed while minimizing the space required.

Conventional testing units typically require a significant quantity of space for normal operations, which may be disadvantageous during circumstances in which space and/or access is limited, such as when performing testing operations from an offshore platform. In addition to the use of two testing apparatus within a single housing, embodiments usable within the scope of the present disclosure may include a compact housing having features that facilitate access while minimizing the space required. For example, the housing may include one or more hinges (e.g., horizontal hinges positioned centrally or near an edge) to permit access to the housing in limited access areas, by minimizing the space required to pivot and/or manipulate the hinge and any movable portions of the housing attached thereto. An example embodiment may include two horizontal hinges (e.g., "piano" hinges) to enable a panel of the housing to be folded twice to access the apparatus while requiring significantly reduced clearance to do so.

To further facilitate use of embodiments described herein on offshore platforms and similar locations that may possess a large quantity of ambient noise, embodiments usable within the scope of the present disclosure may include visual indicators (e.g., lights) positioned on the housing, such as on the buttons, switches, and/or similar input devices used to activate, deactivate, and/or control one or both of the testing units. Visual indicators significantly improve safe operation of the testing apparatus, which may otherwise operate undetected when ambient noise exceeds the noise produced by the testing apparatus. In further embodiments, an emergency stop system may be provided in communication with one or both testing units for enabling manual and/or automatic shut-off of one or both testing apparatus. Embodiments may also include a safety stop system coupled with the housing (e.g., on an access panel) to automatically prevent operation of one or both testing apparatus when the housing is opened and/or otherwise manipulated to provide access to one or both testing apparatus. An example embodiment may include two safety stop systems, each engaged with a respective access panel for accessing each testing unit. To further enhance safety and/or efficiency, in an embodiment, one or both testing units may be remotely operable.

In various embodiments, one or both testing units may be interchangeably used to selectively flow any fluid or mixture, such as water, glycol, or mixtures thereof, and one or both testing units may include a four-port manifold positioned on the housing for coupling with corresponding devices and/or recording devices. In further embodiments, one or more recording devices, such as chart recorders, may be coupled with either or both of the testing units.

Figure 1B:
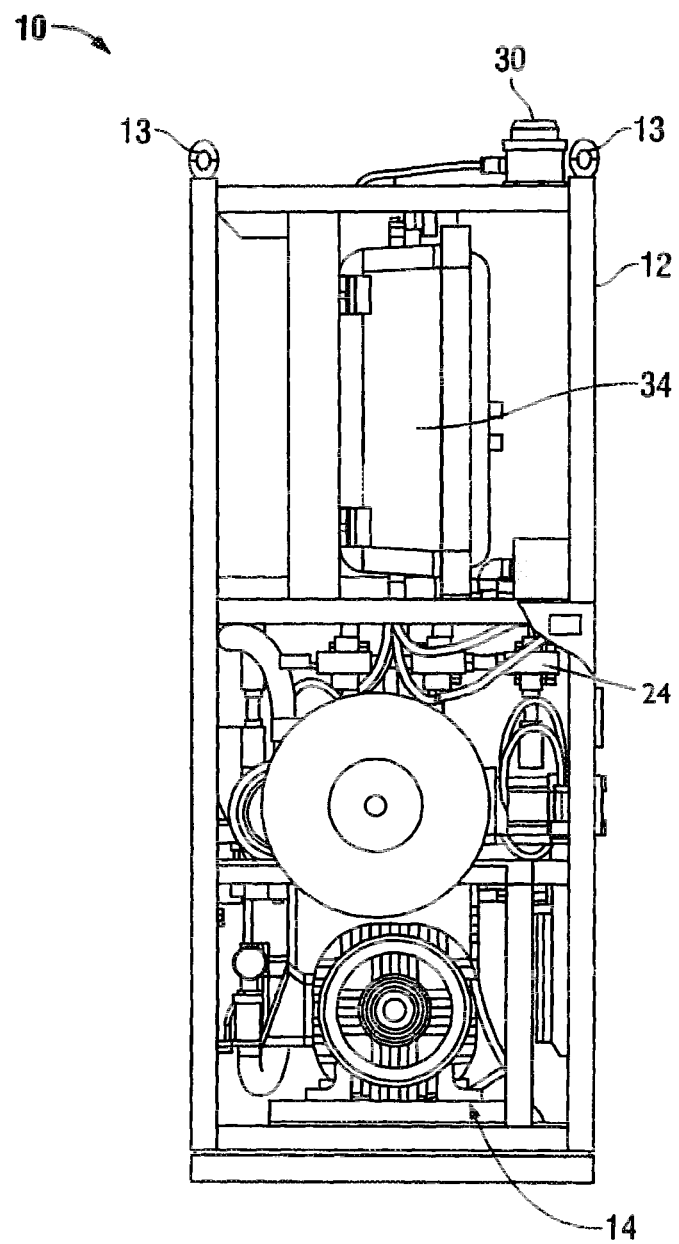
FIG. 1B depicts a left-side view of the apparatus of FIG. 1A.
Figure 1C:
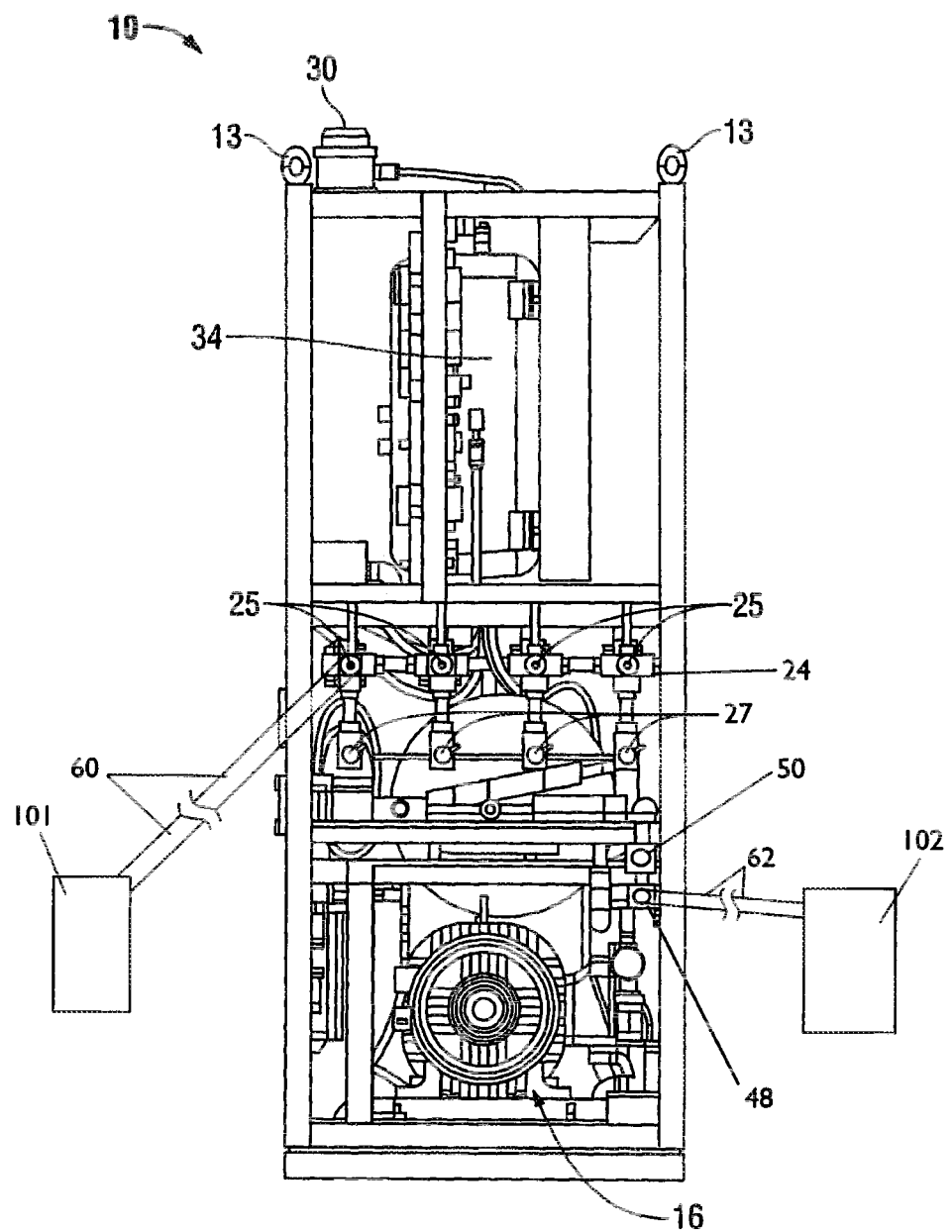
FIG. 1C depicts a right-side view of the apparatus of FIGS. 1A and 1B.
Figure 1D:
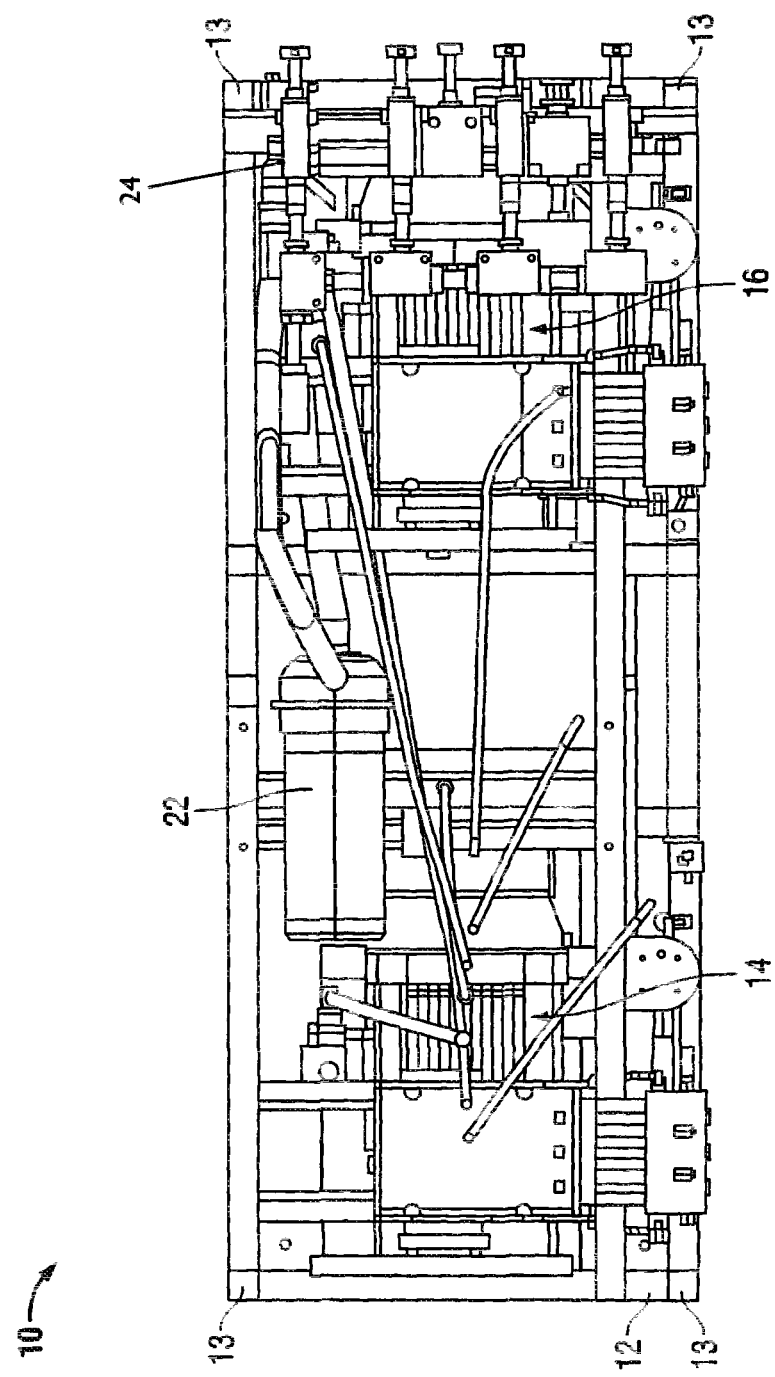
FIG. 1D depicts a top view of the apparatus of FIGS. 1A through 1C.

Referring now to FIGS. 1A through 1D, a diagrammatic view of an embodiment of an apparatus (10) for applying a pressure to one or more objects, typically for testing of such objects, is shown. Specifically, FIG. 1A depicts a front view of the apparatus (10), FIG. 1B depicts a left side view thereof, FIG. 1C depicts a right side view thereof, and FIG. 1D depicts a top view.

The apparatus (10) is shown having a unitary, generally compact housing (12) containing substantially all components of the apparatus (10). Typically, the housing (12) may be constructed of one or more metals, alloys, composites, polymers, or combinations thereof, rated and/or otherwise sufficient to withstand corrosive and/or damaging environments, such as those found on offshore platforms or similar industrial areas. In an embodiment, the housing (12) may include explosion-proof materials, and one or more access panels for selectively providing access to various components of the apparatus (10). The housing (12) is shown having eye bolts (13) and/or similar features at each upper corner thereof, to facilitate lifting and installation of the apparatus (10) in a desired location.

Specifically, the apparatus (10) is shown including a first pump motor (14) disposed on a first side of the housing (12), and a second pump motor (16) disposed on a second side of the housing (12). Each pump motor (14, 16) is shown coupled to a respective series pump (18, 20), therein. In one embodiment, the pumps (18, 20) may include Series 50, 50-horsepower pumps, which provide a substantial improvement in efficiency and reliability over preexisting, lower power pumps (e.g., EK Series, 25-horsepower pumps). The series pumps (18, 20) are shown coupled to various compressors, chambers, and/or valves usable to provide fluid through a conduit (60, 62) coupled to an object (101, 102) coupled thereto, as known in the art. It should be noted that while FIGS. 1A through 1D depict the first and second pump motors (14, 16) and series pumps (18, 20) as generally identical units, in various embodiments, the housing (12) could include two different types of testing units, such as a first testing unit usable and/or capable of providing a first pressure to an object (101), and a second testing unit usable and/or capable of providing a second, different pressure to the same object (101), or, as depicted, a second object (102). Identical testing units, however, may also be used to provide any desired pressure to any type of object, within the operational capabilities of the testing units.

An auxiliary pump (22) is shown directly coupled to the first series pump (18). In an embodiment, the auxiliary pump (22) could also be coupled to the second series pump (20). Specifically, FIGS. 1A through 1D depict the auxiliary pump (22) as a direct drive charge pump, usable to facilitate rapid achievement of a desired pressure with one or both series pumps (18, 20), without requiring use of intervening members (e.g., without requiring belts or similar indirect drive mechanisms). In further embodiments, the first and second series pumps (18, 20) could be fluidly coupled together in a manner that enables the respective series pumps (18, 20) of one testing unit to be used to more rapidly achieve a desired testing pressure with the other testing unit.

A four-port manifold (24) is shown disposed at an end of the housing (12), fluidly coupled to first series pump (18). During operation, one or more objects to be tested (101, 102) using series pump (18), and/or recording devices (e.g., chart recorders) may be coupled with the manifold (24) and/or any other suitable ports and/or connectors disposed in communication with one or more of the series pumps (18, 20). While FIGS. 1A through 1D depict a configuration that includes four ports (25), generally equally spaced in a horizontal line at one end of the housing (12) in communication with the first series pump (18) and first conduit (60) and first object (101), it should be understood that the depicted embodiment is exemplary, and that any configuration of ports and/or connectors in communication with one or both series pumps (18, 20) may be positioned on any portion of the apparatus (10).

Both pump motors (14, 16) are further shown in communication with an operational panel (26), which may include any number and type of gauges, meters, switches, and similar input, output, and/or display devices, known in the art, usable to control and/or monitor operation of the testing units. The panel (26) is shown including a series of input buttons (28) disposed thereon, which, in an embodiment, may be remotely actuatable to enable increased efficiency and safety. Specifically, the depicted embodiment shows six buttons, three of which may be operable to control the first testing unit through the first pump motor (14), and three of which may be operable to control the second testing unit through the second pump motor (16). For example, "Start," "Stop," and "Jog," buttons, switches, and/or similar control devices may be provided for each pump motor (14, 16), the buttons being manually operable, remotely operable, or combinations thereof. In a further embodiment, the input buttons (28) may be provided with lights and/or other visual indicators, such that when one or both pump motors (14, 16) are operable, respective buttons (28) may be lit to provide an indication workers and/or operators in the area that one or both testing units are currently in operation. This feature may be of significant benefit in a location having a large quantity of ambient noise, which may prevent an individual from hearing the operational noises produced by the apparatus (10).

To further enhance safe operation of the apparatus (10), the depicted embodiment is also shown having an additional visual indicator (30) (e.g., a strobe light) positioned on the top surface of the housing (12), which may be actuated when one or both testing units are in operation.

The depicted apparatus (10) is further shown having an electrical enclosure (34) coupled with the pump motors (14, 16). Specifically, the electrical enclosure (34) is shown having an emergency stop system (37) positioned thereon, such that operation of one or both of the testing units (14, 16) may be stopped and/or prevented through manual and/or remote engagement of the emergency stop system (37). The depicted emergency stop system (37) is shown including start and stop buttons for actuating the auxiliary pump (22), and respective "Reset" buttons for controlling the testing units (14, 16). In an embodiment, the emergency stop system (37) may be configured to automatically cease and/or prevent operation of one or both testing units (14, 16) if certain conditions are met, such as a drop in pressure or other indications of a leak in the apparatus (10) and/or the object(s) being tested (101, 102), and/or the connection therebetween. The emergency stop system (37) is additionally coupled to a pair of door interlock switches (32, 33), which are operably coupled to the first and second pump motors (14, 16), respectively, as an automatic cutoff upon detection that an access panel in the housing (12) for accessing one or both testing units is currently open.

In operation, two objects (101, 102) (e.g., risers, blowout preventers, and/or similar devices, vessels, or conduits) may be coupled to respective series pumps (18, 20) via conduits (60, 62) coupled to ports (25) of the four port manifold (24) or directly to outlet ports (44, 48) depending on configuration. Chart recorders and/or similar recording devices may be coupled to the apparatus (10), the tested objects (101, 102), or combinations thereof, e.g., for recording the pressure applied by the apparatus (10) to the objects. The first series pump (18) may be used to apply a first selected pressure to a first object (101) (e.g., 22,500 psi), while the second series pump (20) is used to apply a second selected pressure to a second object (102) (e.g., 15,000 psi). Specifically, the input buttons (28) on the panel (26) may be manually and/or remotely manipulated to control the pump motors (14, 16), while the operation of the apparatus (10) may be monitored using the instruments positioned on the panel (26) and/or the recording devices engaged with the apparatus (10). During operation of the apparatus (10), the input buttons (28), and/or the additional visible indicator (30) may emit light to indicate operation of one or both testing units.

The selected pressure applied by the first series pump (18) may be achieved rapidly through use of the auxiliary pump (22), in conjunction with the manifold (24) associated with the first series pump (18). In other embodiments, the auxiliary pump (22) could be provided in communication with the second series pump (20). Once the desired testing pressure(s) are achieved, the apparatus (10) may maintain the pressure(s) for a selected period of time while recording devices may be used to monitor the integrity of the objects (101, 102) being tested. In the event that it becomes necessary or desirable to stop operation of the apparatus (10) due to emergent reasons, the emergency stop system (37) positioned on the electrical enclosure (34) may be manually and/or remotely actuated.

Figure 2A:
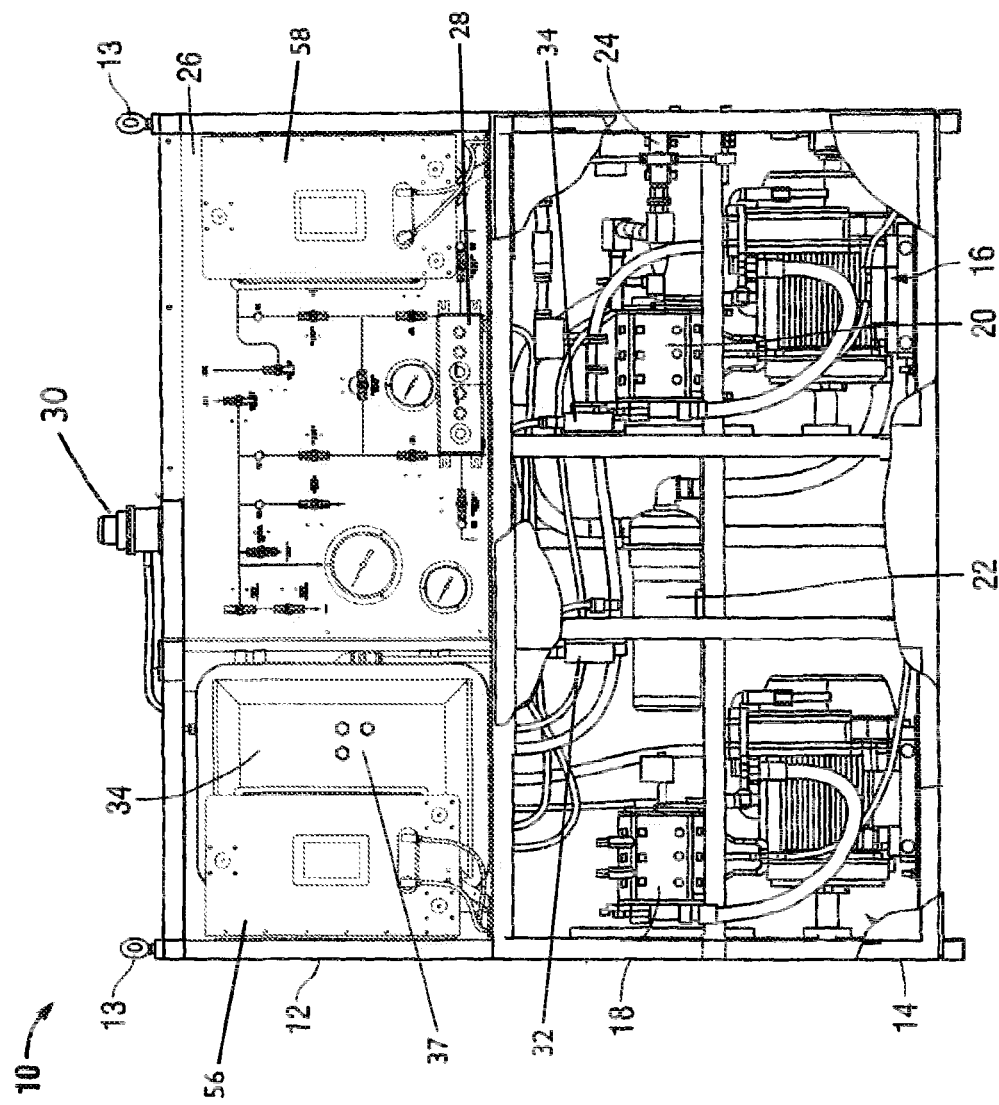
FIG. 2A depicts a front diagrammatic view of an embodiment of a testing apparatus.
Figure 2B:
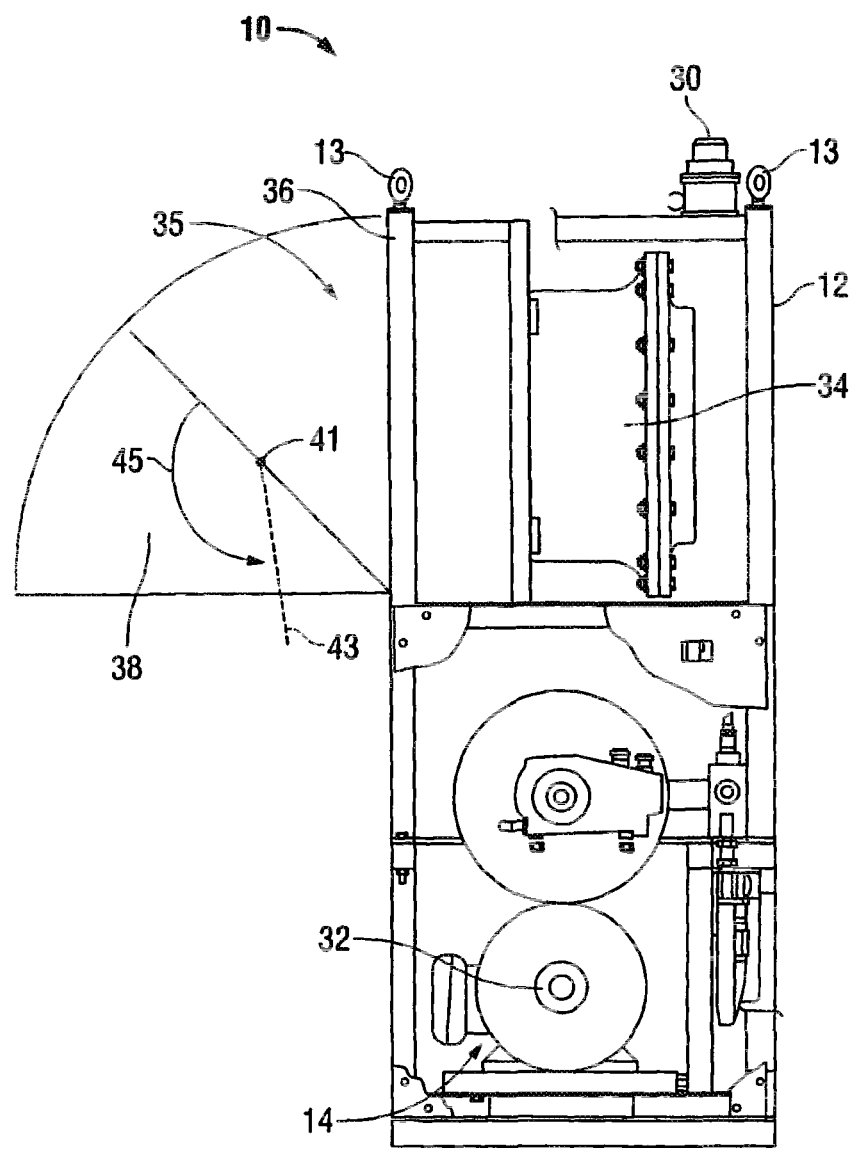
FIG. 2B depicts a left-side view of the apparatus of FIG. 2A.
Figure 2C:
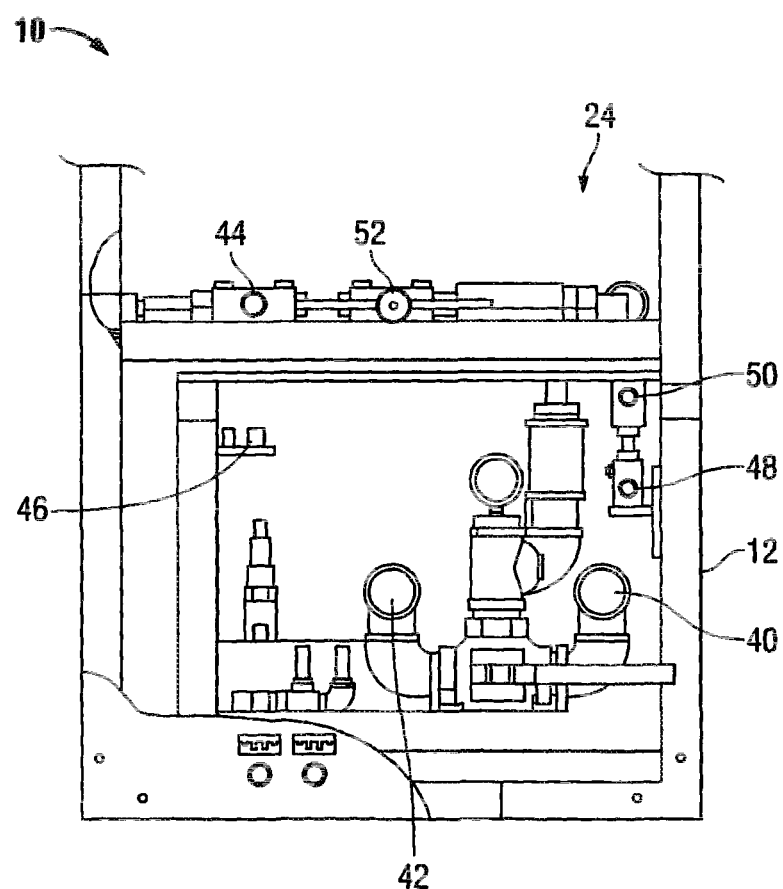
FIG. 2C depicts a partial right-side view of the apparatus of FIGS. 2A and 2B.

Referring now to FIGS. 2A through 2D, a diagrammatic view of another embodiment of an apparatus (10) is depicted. Though not identical to the embodiment shown in FIGS. 1A through 1D, similar parts have been provided with identical reference numerals for clarity. Specifically, FIG. 2A depicts a front view of the apparatus (10), FIG. 2B depicts a left side view thereof, FIG. 2C depicts a partial right side view thereof, and FIG. 2D depicts a top view.

As described previously, a housing (12) is shown having a first pump motor (14) with a first pump (18) positioned at a first end thereof, and a second pump motor (16) with a second pump (20) positioned at a second end thereof, with an auxiliary pump (22) therebetween. The housing (12) is shown including eye bolts (13) and/or similar members to facilitate lifting and/or movement thereof. The depicted housing (12) is also shown having a rear access panel (35) movable between a closed position (36) and an open position (38) (e.g., by pivoting the access panel (35) along one or multiple horizontal hinges). The depicted access panel (35) may enable access to one or more parts within the housing (12) while minimizing the space required for this access, which may be of particular use in a location where space is limited, such as an offshore platform. In further embodiments, the access panel (35) could include multiple hinges. For example, a "piano hinge" configuration is shown in which an additional horizontal hinge (41) is provided across the approximate center of the panel (35), enabling the upper portion thereof (43) to be pivoted along the hinge in the direction indicated by arrow (45), further reducing the amount of space required to open panel (35) and access the contents therein.

A manifold (24) is shown disposed at an end of the housing (12), coupled to first series pump (14). While FIGS. 2A through 2D depict a specific arrangement and number of ports, it should be understood that any arrangement of inlet and outlet ports may be used without departing from the scope of the present disclosure. Specifically, FIG. 2C depicts a water inlet (40) and a glycol inlet (42) for receiving water and glycol, respectively, into the apparatus (10) for pumping into a desired conduit, vessel, device, and/or other object to achieve a selected pressure. A switch or similar input device may be used to select whether water, glycol, or various mixtures thereof is used by the apparatus (10) when testing one or more objects (101, 102). The switch could be positioned on or proximate to the manifold (24), on or proximate to the operational panel (26) or input buttons (28), or elsewhere on the apparatus (10).

The apparatus (10) is further shown including a first outlet port (44), which may be used to test and/or otherwise communicate and/or pressurize fluid from the first series pump (18) to the manifold (24), and a first recording port (46), which may be used to communicate pressure and/or other information to a chart recorder or similar recording device, as known in the art. The apparatus (10) is also shown having a second outlet port (48), usable to test and/or otherwise communicate and/or pressurize fluid from the second series pump (20) to the second conduit (62), and a second recording port (50), usable to communicate pressure and/or other information to a chart recorder or similar device. The first outlet port (44) and/or recording port (46) are thus in fluid communication with each other, as well as the first series pump (18), used during operation thereof, while the second outlet port (48) and/or recording port (50) are in fluid communication with each other, as well as the second series pump (20). The manifold (24) is further shown having a series of manifold control valves (27) for selectively closing and isolating ports (25) from each other, first outlet port (44), second outlet port (48), or combinations thereof.

The apparatus (10) is additionally shown having an isolation valve (54) for selectively placing the auxiliary pump (22) into communication with the water and glycol inlet ports (40, 42), first outlet port (44), or in various embodiments, with the second outlet port (48), with both outlet ports (44, 48), or isolating the auxiliary pump (22) from fluid communication with the apparatus altogether. It should be understood that the manifold (24) may include any additional number and type of conduits, drains, valves, pumps, indicators, and/or other similar elements, any of which may be manually, automatically, and/or remotely controllable.

The depicted embodiment of the apparatus (10) is also shown having an operational panel (26) with lighted input devices (28) thereon, positioned above the second series pump (20), and an electrical enclosure (34) that may include an emergency stop system (37) and/or other components, positioned above the first series pump (18). The depicted, compact arrangement of components may be of particular use when space for containing the apparatus (10) is limited. As described previously, the apparatus (10) may also include door interlock cutoff switches (32, 33), and a light or similar visible indicator (30) disposed along the top or another portion of the housing (12), for indicating when one or both of the testing units are in operation.

Figure 3A:
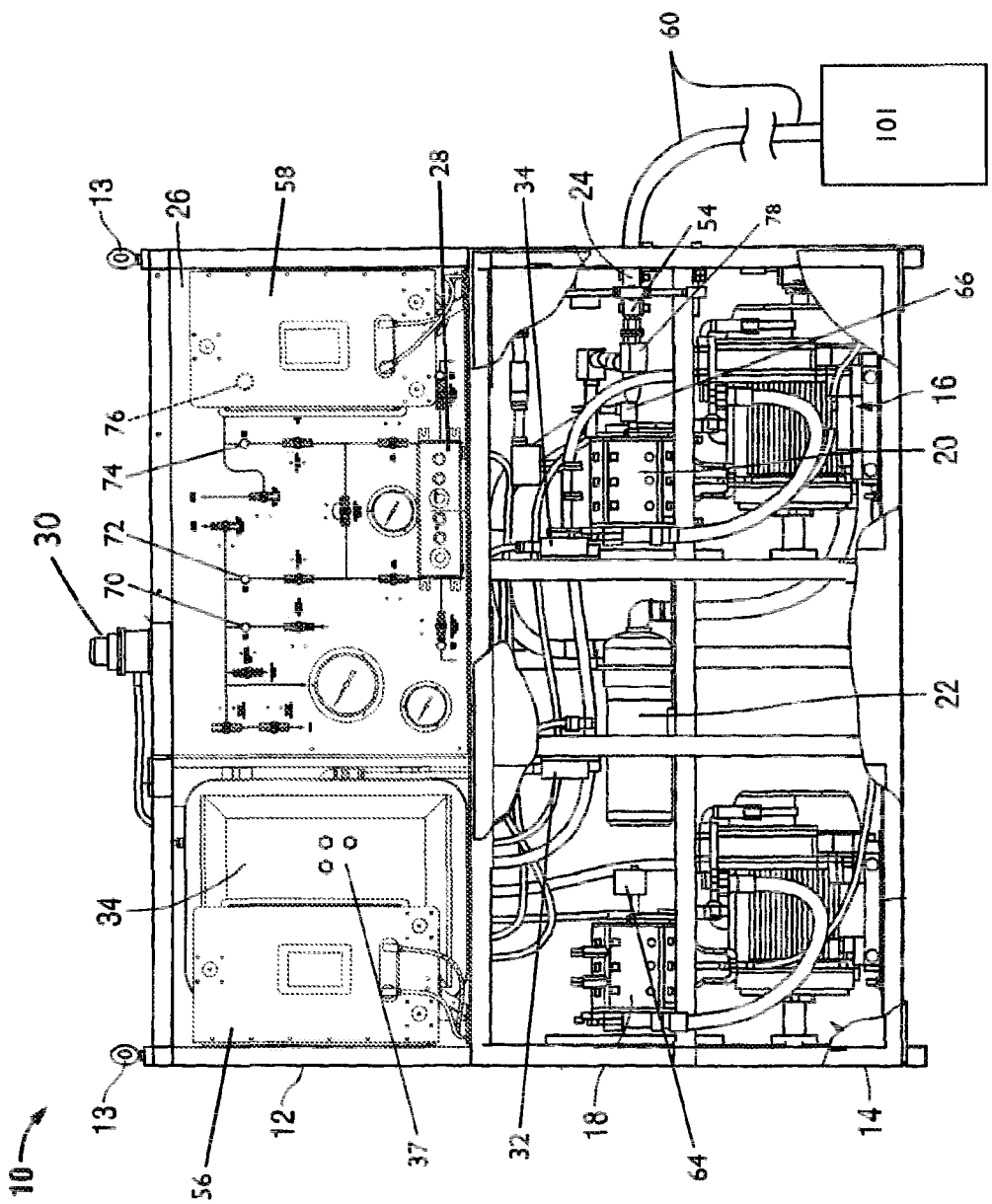
FIG. 3A depicts a front diagrammatic view of an embodiment of a testing apparatus.
Figure 3B:
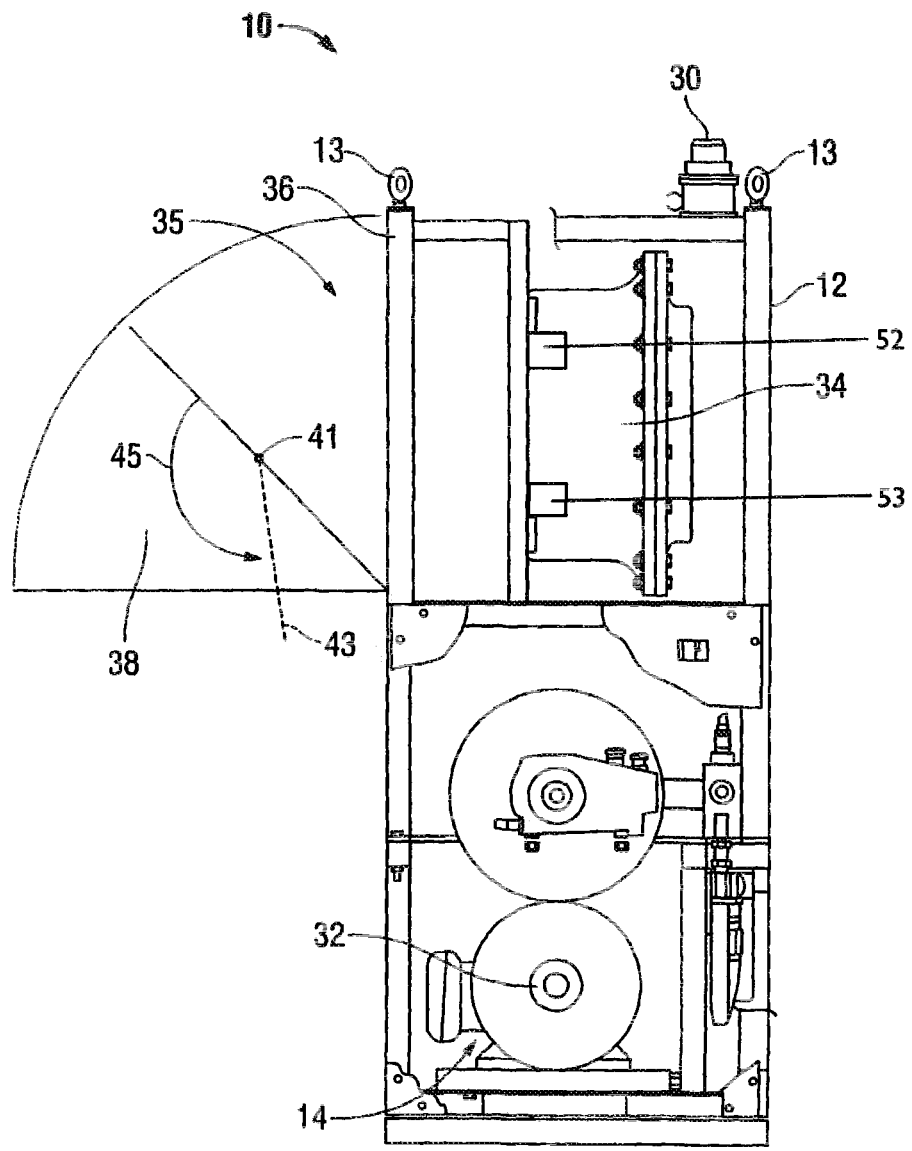
FIG. 3B depicts a left-side view of that apparatus of FIG. 3A.
Figure 3C:
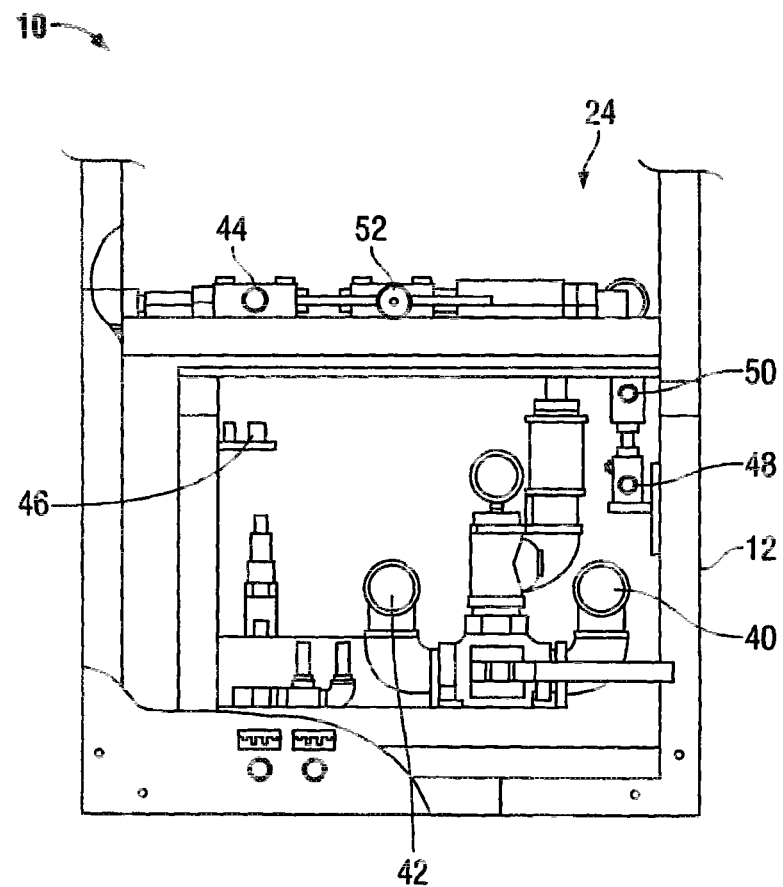
FIG. 3C depicts a partial, right-side view of the apparatus of FIGS. 3A and 3B.
Figure 3D:
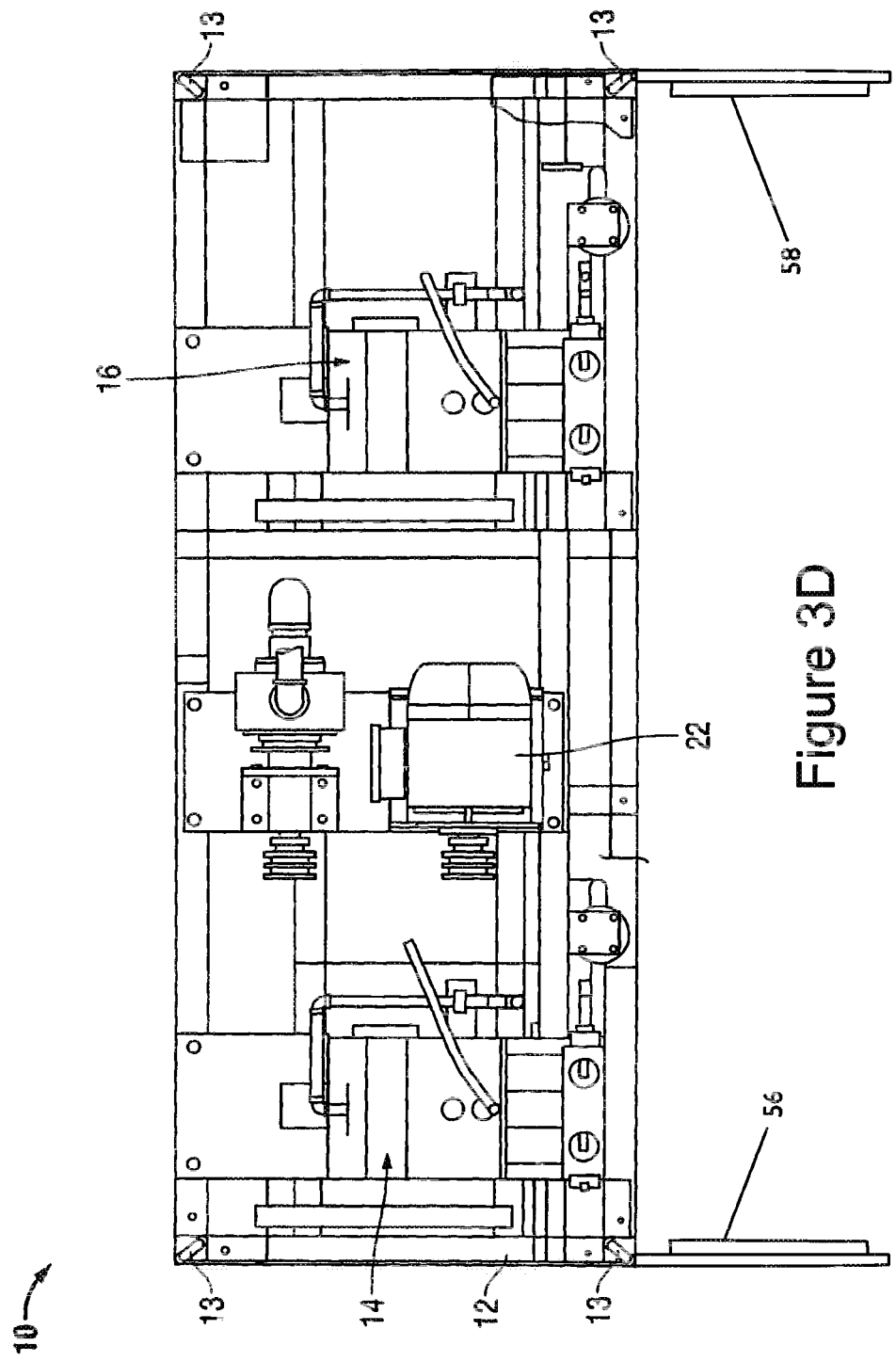
FIG. 3D depicts a top view of the apparatus of FIGS. 3A through 3C.
Figure 3E:
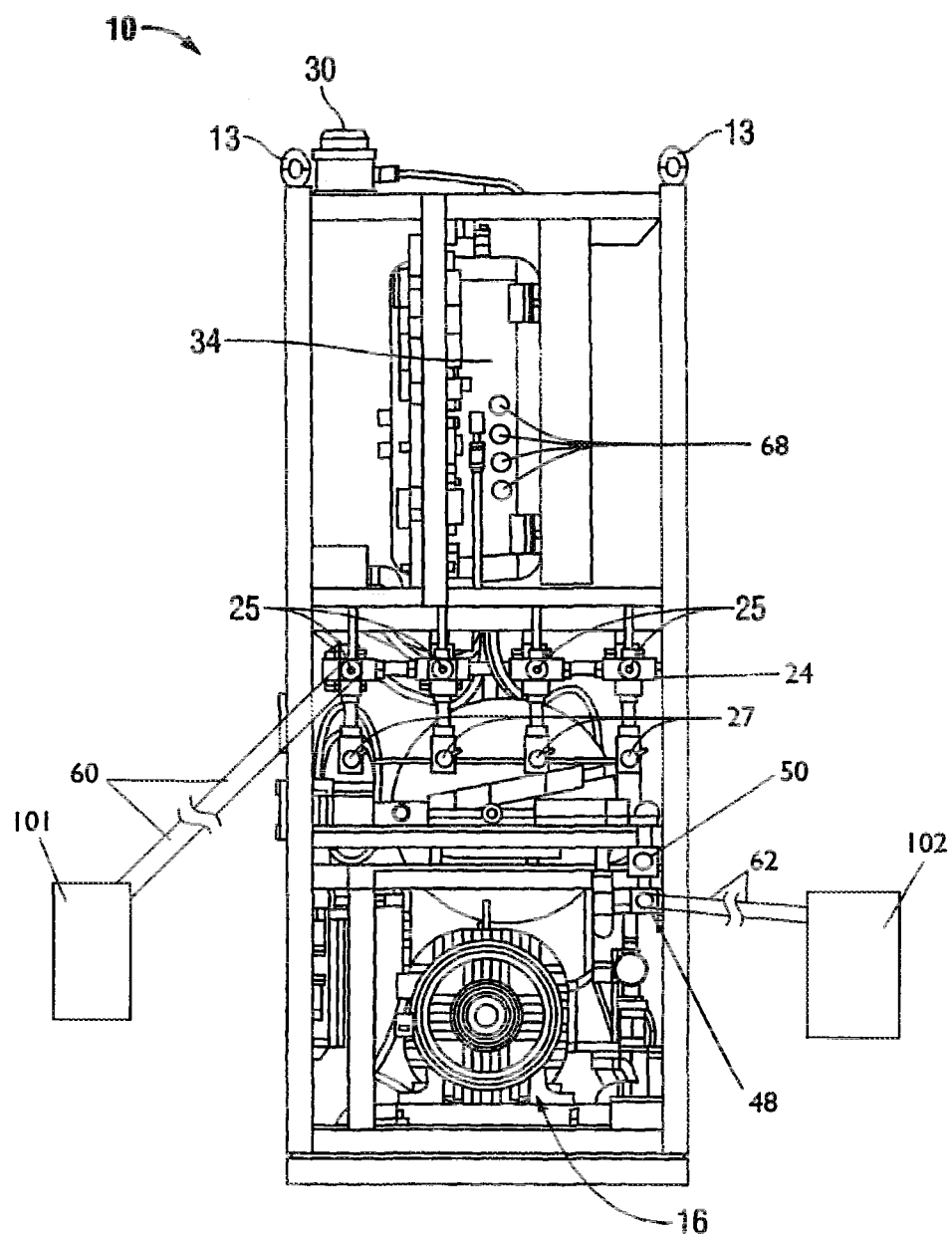
FIG. 3E depicts a right-side view of the apparatus of FIGS. 3A through 3D.
Figure 3F:
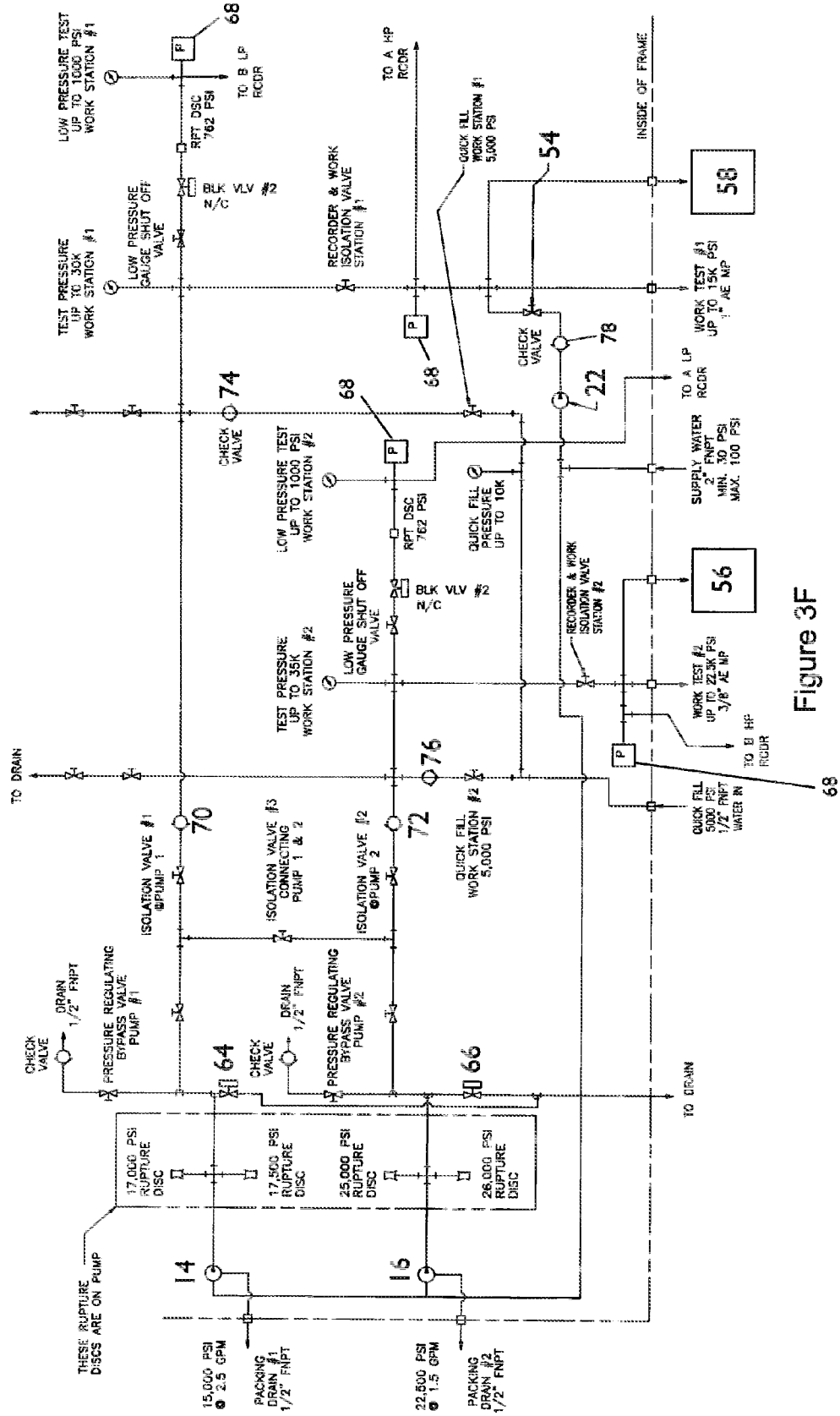
FIG. 3F depicts a simplified flow schematic of the apparatus of FIGS. 3A through 3E.

Referring now to FIGS. 3A through 3F, a diagrammatic view of an embodiment of an apparatus (10) for applying a pressure to one or more objects is depicted. Though not identical to the embodiment shown in FIG. 1A-1D, or 2A-2D, similar parts have been provided with identical reference numerals for clarity. Specifically, FIG. 3A depicts a front view of the apparatus (10), FIG. 3B depicts a left side view thereof, FIG. 3C depicts a partial right side view thereof, FIG. 3D depicts a top view, and FIG. 3E depicts a right side view of the apparatus of FIGS. 3A through 3D. Additionally, FIG. 3F depicts a simplified flow schematic of the embodiment.

As described previously, a housing (12) is shown having a first pump motor (14) with a first series pump (18) positioned on a first side thereof, and a second pump motor (16) with a second series pump (20) positioned on a second side thereof, with an auxiliary pump (22) therebetween. The first pump motor (14) and series pump (18) may be used to apply a first selected pressure to a first object (101) (e.g. 22,500 psi), while the second pump motor (16) and series pump (20) are used to apply a second selected pressure to a second object (102) (e.g. 15,000 psi). The housing (12) is shown including eye bolts (13) and/or similar members to facilitate lifting and/or movement thereof. The depicted housing (12) is also shown having a rear access panel (35) movable between a closed position (36) and an open position (38) with some embodiments including multiple hinges, such as a "piano hinge" configuration as shown in which an additional horizontal hinge (41) is provided across the approximate center of the panel (35), enabling the upper portion thereof (43) to be pivoted along the hinge in the direction indicated by arrow (45).

A manifold (24) is shown disposed at an end of the housing (12), coupled to first series pump (18). While FIGS. 3A through 3F depict a specific arrangement of a four-port (25) manifold having control valves (27), it should be understood that any arrangement of manifold ports may be used without departing from the scope of the present disclosure. FIG. 3C depicts a water inlet (40) and a glycol inlet (42) for receiving water and glycol, respectively, into the apparatus (10) for pumping into a desired conduit, vessel, device, and/or other object to achieve a selected pressure. A switch or similar input device may be used to select whether water, glycol, or various mixtures thereof is used by the apparatus (10) when testing one or more objects (101, 102). The switch could be positioned on or proximate to the manifold (24), on or proximate to the operational panel (26) or input buttons (28), or elsewhere on the apparatus (10).

The apparatus (10) is further shown including a first outlet port (44), which may be used to test and/or otherwise communicate and/or pressurize fluid from the first series pump (18) into the manifold (24), and a first recording port (46), used to communicate pressure and/or other information to a first chart recorder (56). The apparatus (10) is also shown having a second outlet port (48), usable to test and/or otherwise communicate and/or pressurize fluid from the second series pump (20) into the manifold (24), and a second recording port (50), usable to communicate pressure and/or other information to a second chart recorder (58). The first outlet port (44) and/or recording port (46) may be in fluid communication with each other and the first series pump (18), used during operation thereof, while the second outlet port (48) and/or recording port (50) are in fluid communication with each other and the second series pump (20). First recording port (46) may be used to communicate pressure or other useful information to first chart recorder (56). Similarly, second recording port (50) may be used to communicate pressure or useful information to second chart recorder (58).

A chart recorder is typically an electro-mechanical device that records an electrical or mechanical input onto a piece of paper, the chart. Chart recorders may be mechanical with clockwork mechanisms, electro-mechanical, with an electrical clockwork mechanism for driving the chart, or entirely electronic with no mechanical components at all. An entirely electronic chart recorder is sometimes referred to as a "virtual chart recorder." In FIG. 3A, a circular chart recorder (56, 58) with a rotating disc of paper is used. It has been found that this type of chart recorder is more compact and amenable to being enclosed behind a glass.

The apparatus (10) is additionally shown having an isolation valve (54) for selectively isolating auxiliary pump (22) from fluid communication, or placing auxiliary pump

(22) into communication with the water/glycol inlet ports (40, 42) and the first outlet and recording ports (44, 46). In other embodiments, isolation valve (54) may be configured to place auxiliary pump (22) into communication with second outlet and recording ports (48, 50). It should be understood that the manifold (24) may include any additional number and type of conduits, drains, valves, pumps, indicators, and/or other similar elements, any of which may be manually, automatically, and/or remotely controllable.

The depicted embodiment of the apparatus (10) is also shown having an operational panel (26) with lighted input devices (28) thereon, positioned above the second series pump (20), and an electrical enclosure (34) that may include an emergency stop system (37) and/or other components, positioned above the first series pump (18). As described previously, the apparatus (10) may also include door interlock cutoff switches (32, 33), and a light or similar visible indicator (30) disposed along the top or another portion of the housing (12), for indicating when one or both of the testing units are in operation.

In some circumstances, it may be desirable to have the testing unit rapidly vent pressure once after the testing conduit (60, 62) has pressurized the object (101, 102) to the desired pressure. In an example embodiment, this is achieved through the use of dump valves (64, 66) providing an outlet for fluid between the series pumps (18, 20) and the manifold (24). In the depicted embodiment, these dump valves are controlled through the use of solenoids (52, 53) located on the left side of electrical enclosure (34). It should be appreciated, however, that the solenoids (52, 53) are not limited to this location.

In operation, a preselected pressure is set on the operational panel (26) which is in communication with electrical enclosure (34). Electrical enclosure (34), in addition to solenoids (52, 53), contains pressure transducers (68) which, in the depicted embodiment, are located on the right side of the electrical enclosure. (As with the solenoids, it should be appreciated that pressure transducers are not limited to this location.) The depicted embodiment includes four pressure transducers (68) in fluid communication with the four ports of the depicted manifold (24) configuration for monitoring the manifold outputs for the preselected pressure. Upon detection of the preselected pressure in the manifold, pressure transducers (68) activate either first solenoid (52) or second solenoid (53) as appropriate. First solenoid (52) or second solenoid (53) then actuates first dump valve (64) or second dump valve (66), respectively, so as to prevent pressure from building up beyond the preselected pressure. In the example embodiment, this takes about five milliseconds. All told, the process of opening the dump valve and rapidly venting pressure should take about 200 milliseconds. It is desirable to vent the pressure because series pump (18) will continue to operate and may be damaged by back pressure if it is unable to vent. While pump motors (14, 16) shut down, dump valves (64, 66) redirect excess fluid to drains (not shown).

Furthermore, since many situations require the objects (101, 102) to withstand a particular pressure for periods ranging from several minutes to several days, the depicted embodiment also comprises check valves (70, 72, 74, 76) located behind the operational panel (26). These check valves restrict the flow of fluid between the series pumps (18, 20) and the ports (25) of the manifold (24), maintaining the preselected pressure on the test objects (101, 102) within the test conduits (60, 62), while any excess fluid is forced back through the system towards the dump valves (64, 66).

An auxiliary check valve (78) is positioned behind the manifold (24) to restrict the fluid communication of the auxiliary pump (22).

Figure 4:
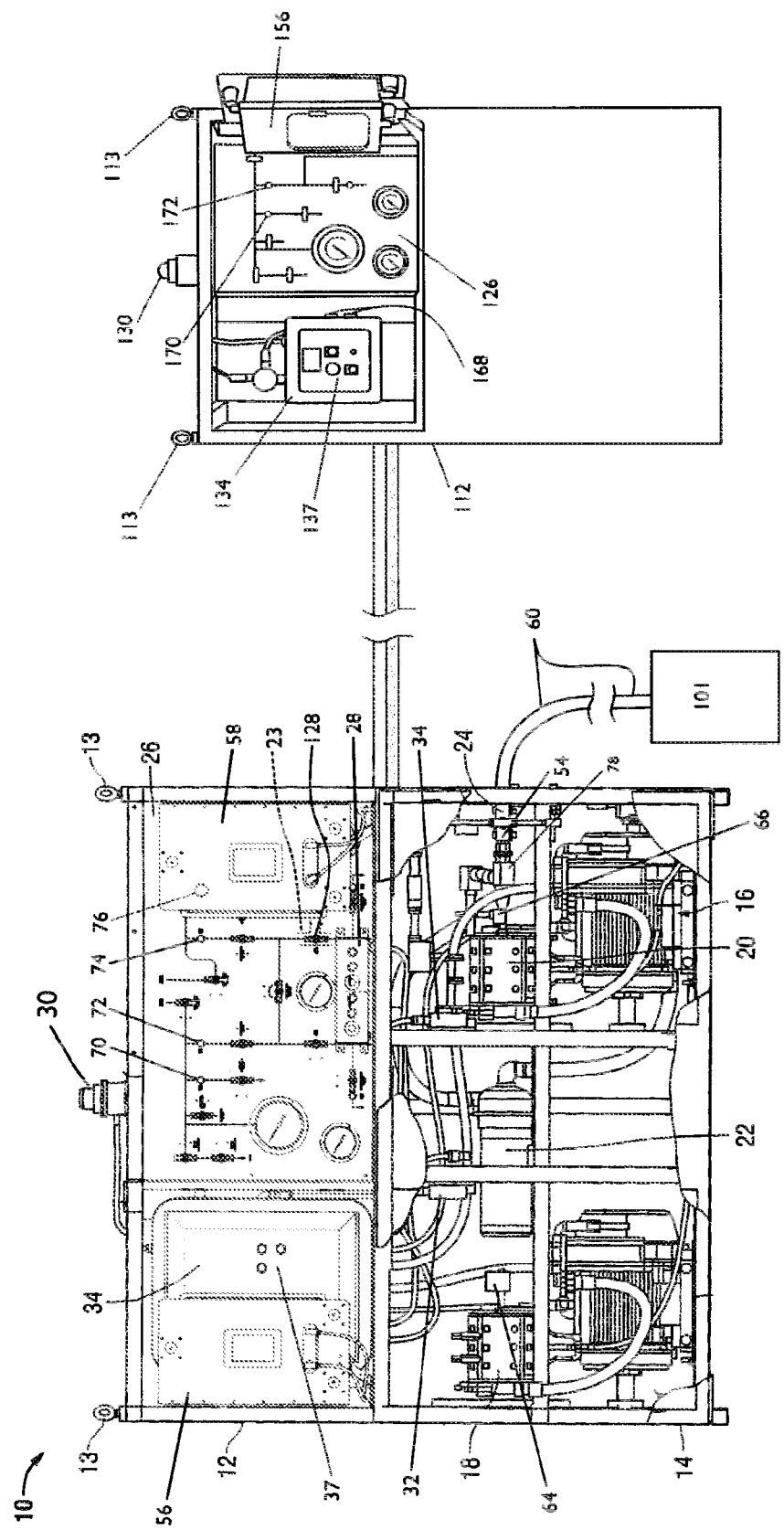
FIG. 4 depicts a front diagrammatic view of an embodiment of a remote-capable testing apparatus.

Referring now to FIG. 4, a diagrammatic view of an embodiment of an apparatus (10) for applying a pressure to one or more objects is depicted. This apparatus is similar to the embodiments depicted in FIGS. 1A-1D, 2A-2D, and 3A-3F, and similar parts have been provided with identical reference numerals for clarity as described above. The embodiment in FIG. 4 is depicted with a plurality of operational panels and electrical enclosures; in addition to the operational panel (26) and electrical enclosure (34) located within the housing (12), the embodiment is shown with a remote operational panel (126), remote electrical enclosure (134), and remote chart recorder (156) in a remote housing (112) containing eye bolts (113) and an activation light (130) which may be positioned at a distance from the main housing (12) while still in electrical and fluid communication with a test unit comprising one of the pump motors (14 or 16), one of the series pumps (18 or 20), dump valve (64 or 66), optional auxiliary pump (22), and in communication with the manifold (24) within the housing (12). In the depicted embodiment, the remote operational panel (126) is operating the second test unit.

This remote unit is activated through the use of a selective high-pressure fluid connection (23) at the operational panel (26) of the housing (12). In the depicted embodiment, this high-pressure fluid connection (23) is a T-connection with a remote fluid connection switch (128) located on the operational panel (26). When the remote fluid connection switch (128) is activated, a valve within the fluid connection (23) actuates and fluid communication is established with the remote unit, which contains transducers (168) and check valves (170, 172). The apparatus (10) then operates in the same fashion as the other embodiments. For instance, the remote electrical enclosure (134) has an emergency stop system (137) and additionally the ability to detect and stop the test units upon activation of the door interlock cutoff (33) within the main housing (12). The remote transducers (168), upon detecting the object (102) has reached a preselected pressure determined by entry at the remote control panel (126), remotely actuate solenoid valve (53), which then shuts off the test unit and dumps the excess pressure as previously described. The first or second test pressure is maintained throughout the remote fluid connection against the remote check valves (170, 172).

The use of such remote control panels enables an additional safety factor in the case of high-pressure testing in hazardous areas, as well as additional convenience when the unit itself is positioned to test a large apparatus. It may be appreciated that while the depicted embodiment utilizes a single remote control unit, multiple remote control units may be positioned and selectively utilized through the use of multiple high-pressure fluid connections and valve switches in series.

Embodiments usable within the scope of the present disclosure therefore include apparatus and methods usable to pressure test conduits, tools, vessels, and/or devices rapidly and efficiently, e.g., through simultaneous use of multiple testing units that may include powerful (e.g., 50 horsepower) pumps, directly coupled with an auxiliary and/or prefill pump (e.g., a direct drive charge pump) to further facilitate rapid achievement of target pressures. Further embodiments may be remotely operable, enhancing both safety and efficiency. Embodiments described herein may also minimize the space required for the performance of numerous testing operations, through use of a compact housing that contains multiple testing units, which may include access panels and similar features configured to decrease the space required to provide access. Embodiments described herein may also facilitate safe operations through use of one or more visual indicators and an emergency stop system, which may be automatically, manually, and/or remotely actuatable.

While various embodiments usable within the scope of the present disclosure have been described with emphasis, it should be understood that within the scope of the appended claims, the present invention may be practiced other than as specifically described herein.

What is claimed is:

1. An apparatus for pressure testing conduits, tools, vessels, devices, or combinations thereof, the apparatus comprising:
a first testing unit positioned within a housing, wherein the first testing unit comprises a first pump motor, a first pump operable at a first selected pressure, and a first conduit capable of communicating pressurized fluid from the first pump through a first outlet port to a first object;
a second testing unit positioned within the housing, wherein the second testing unit comprises a second pump motor, a second pump operable at a second selected pressure, and a second conduit capable of communicating pressurized fluid from the second pump through a second outlet port to the first object, a second object, or both; and
an auxiliary pump capable of fluidly communicating with the first outlet port, the second outlet port, or combinations thereof, wherein the auxiliary pump augments the application of the first or second selected pressure to the first object, the second object, or both.

2. The apparatus of claim 1, wherein the first testing unit further comprises a first pressure release valve in fluid communication with the first pump and the first object, the pressure release valve venting pressure from the first conduit if pressure within the first conduit exceeds the first selected pressure, and wherein the first pump motor is de-energized if the first selected pressure is exceeded; and
wherein the second testing unit further comprises a second pressure release valve in fluid communication with the second pump and the first object, the second object, or both, wherein the pressure release valve vents pressure from the second conduit if pressure of the second conduit exceeds the second selected pressure, and wherein the second pump motor is de-energized if the second selected pressure is exceeded.

3. The apparatus of claim 2, further comprising a first plurality of check valves in fluid communication between the first pump and the first outlet port, and a second plurality of check valves in fluid communication between the second pump and the second outlet port, wherein the first and the second plurality of check valves maintain the first or the second selected pressure within the first or the second conduits, respectively.

4. The apparatus of claim 2, further comprising a first solenoid valve and a second solenoid valve, wherein the first solenoid valve activates the first pressure release valve if the first selected pressure is exceeded, and the second solenoid valve activates the second pressure release valve if the second selected pressure is exceeded.

5. The apparatus of claim 1, further comprising a main electrical enclosure in electrical communication with the first and the second testing units capable of recording the first and the second selected pressure, and a main control panel capable of measuring and restricting fluid communication between the first object and the first testing unit, and the second object and the second testing unit.

6. The apparatus of claim 5, wherein the electrical enclosure further comprises an emergency stop system in electrical communication with the first pump, the second pump and the auxiliary pump, wherein the emergency stop system is capable of de-energizing the first pump, the second pump, the auxiliary pump, or simultaneous combinations thereof, when activated.

7. The apparatus of claim 6, further comprising at least a first and a second door interlock switch, the first door interlock switch is electromechanically coupled to the first testing unit, the second door interlock switch is electromechanically coupled to the second testing unit, wherein the first and the second door interlock switch prevent operation of respective testing units when exposed by opening of the housing.

8. The apparatus of claim 1, further comprising a first recording device in fluid communication with the first conduit and a second recording device in fluid communication with the second conduit.

9. The apparatus of claim 8, wherein the first recording device and the second recording device comprise an electromechanical chart recorder, a mechanical chart recorder, a virtual chart recorder, or combinations thereof.

10. The apparatus of claim 5, further comprising a plurality of remote control panels, remote enclosures, and remote recording devices in communication with the main control panel and the main electrical enclosure.

11. The apparatus of claim 1, wherein the housing comprises a surface having at least one hinge adapted to permit access within the housing.

12. The apparatus of claim 1, wherein the housing comprises a first horizontal hinge and a second horizontal hinge adapted to permit a portion of the housing to be pivoted along two horizontal axes to permit access within the housing.

13. A method of concurrently pressure testing a first object and a second object, comprising:
positioning a first test unit within a housing, the first test unit comprising a first pump motor, a first pump operable at a first selected pressure, a first pressure release valve, and a first plurality of check valves;
positioning a second test unit within the housing, the second test unit comprising a second pump motor, a second pump operable at a second selected pressure, a second pressure release valve, and a second plurality of check valves;
connecting a first conduit capable of communicating pressurized fluid to the first pump and the first object;
connecting a second conduit capable of communicating pressurized fluid to the second pump and the second object;
positioning an auxiliary pump within the housing, the auxiliary pump fluidly coupled to the first conduit or the second conduit;
activating the first test unit, the second test unit, the auxiliary pump, or combinations thereof, wherein the auxiliary pump augments the application of the first or second selected pressure to the first or second object, respectively;
actuating the first pressure release valve, venting additional pressure from the first pump, and de-energizing the first pump when pressure in the first conduit reaches the first selected pressure; and actuating the second pressure release valve, venting additional pressure from the second pump, and de-energizing the second pump when pressure in the second conduit reaches the second selected pressure.

14. The method of claim 13, wherein the activating the first test unit, the second test unit, and the auxiliary pump further comprises illuminating a visual indicator positioned on an exterior of the housing, wherein the visual indicator is illuminated as long as the first pump, the second pump or the auxiliary pump are operating.

15. The method of claim 13, wherein the activating the first test unit, the second test unit, the auxiliary pump, or combinations thereof, is performed using a control panel positioned remotely from the housing in communication with the first test unit, the second test unit, the auxiliary pump, or combinations thereof.

16. The method of claim 13, wherein the actuating the first pressure release valve, the venting additional pressure from the first pump, and the de-energizing the first pump, is controlled by a first solenoid valve, wherein the first solenoid valve is in communication with a first pressure transducer, and wherein the first pressure transducer is in communication with the first conduit to detect the first selected pressure; and wherein the actuating the second pressure release valve, the venting additional pressure from the second pump, and the de-energizing the second pump, is controlled by a second solenoid valve, wherein the second solenoid valve is in communication with a second pressure transducer, and wherein the second pressure transducer is in communication with the second conduit to detect the second selected pressure.

17. The method of claim 13, further comprising fluidly connecting the first conduit to a first recording device, and fluidly connecting the second conduit to a second recording device.

18. The method of claim 13, further comprising recording the pressure applied to the first object and recording the pressure applied to the second object.

19. The method of claim 13, further comprising maintaining the first selected pressure on the first object for a test duration.

20. The method of claim 13, further comprising maintaining the second selected pressure on the second object for a test duration.

* * * * *